UNITED STATES PATENT OFFICE.

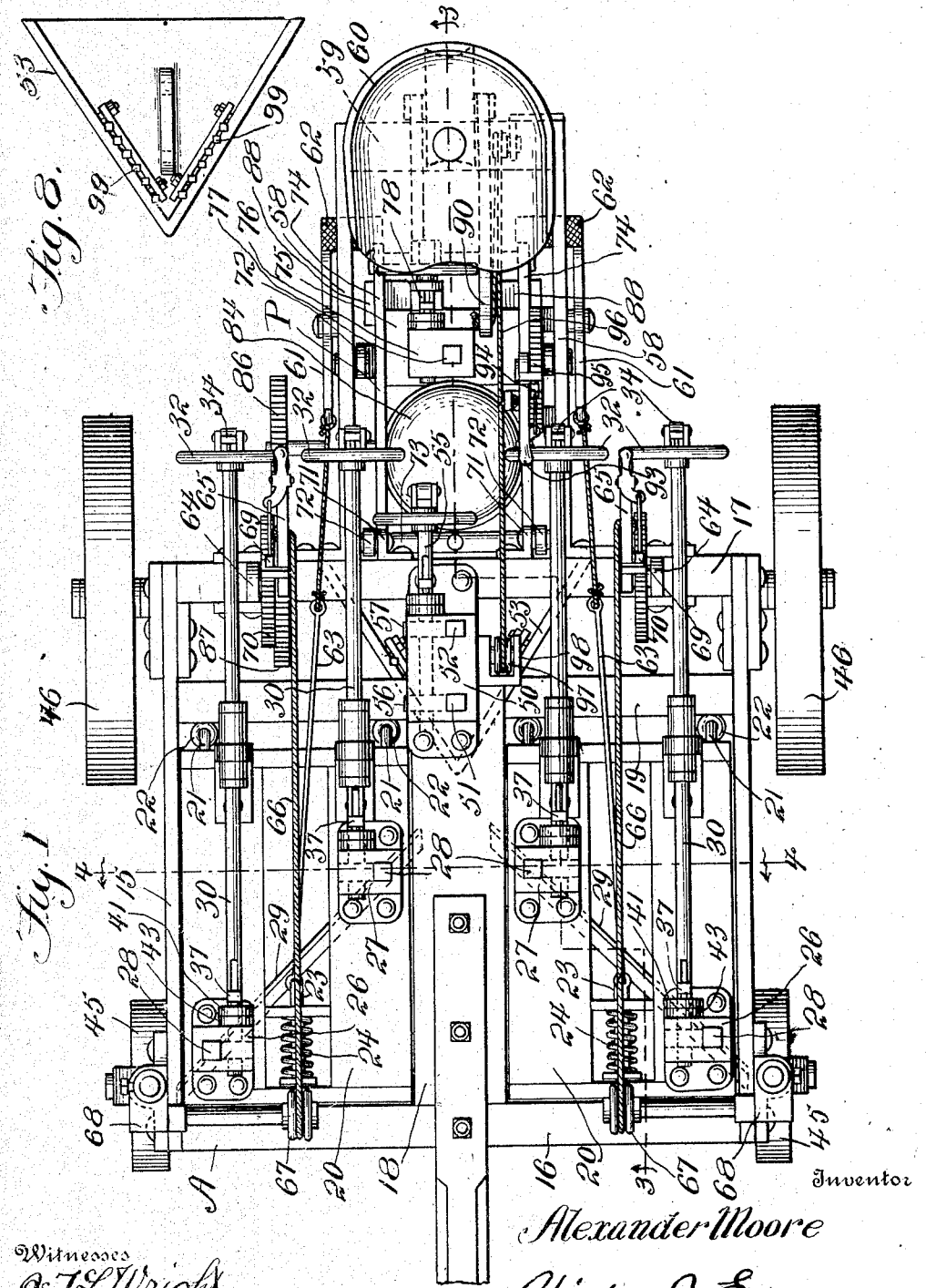

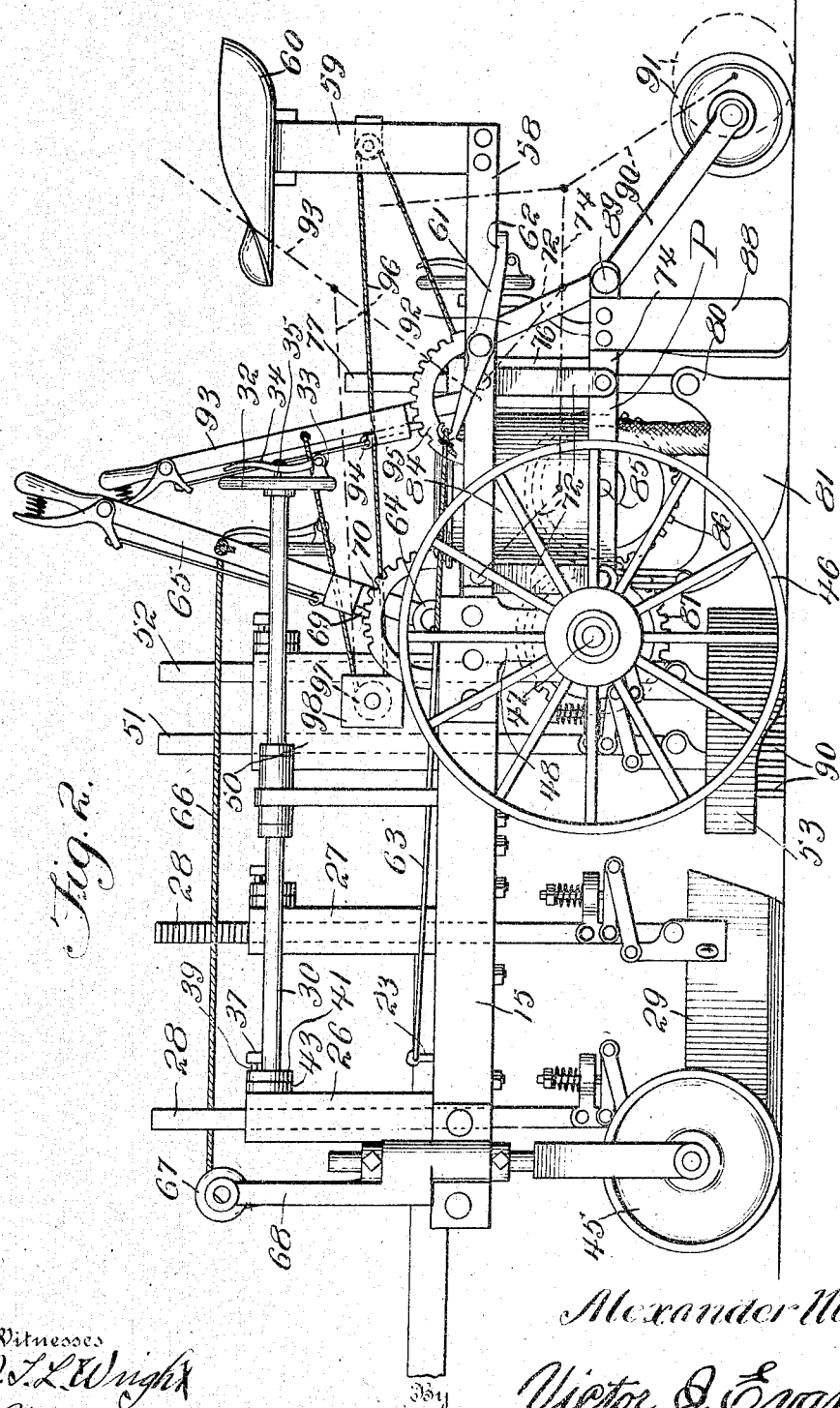

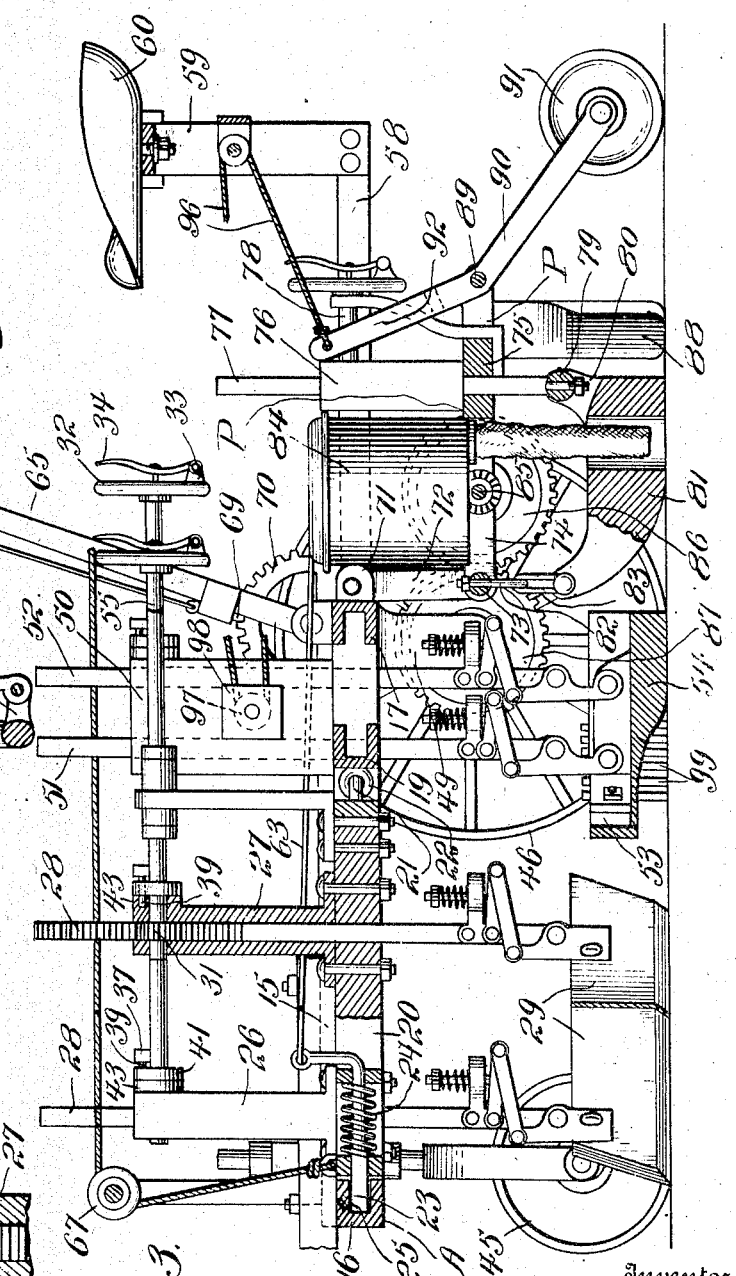

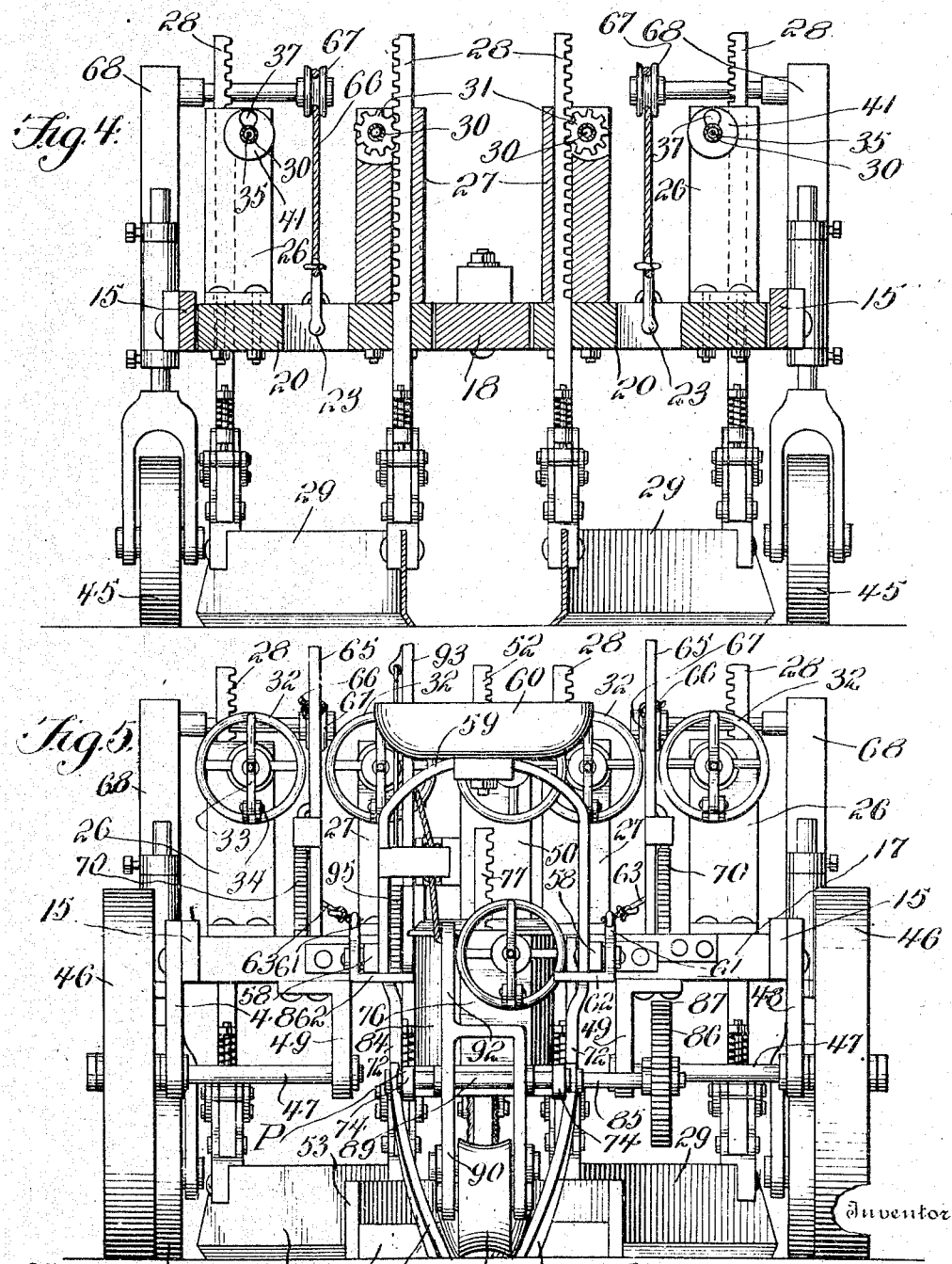

ALEXANDER MOORE, OF FOREST CITY, ARKANSAS.

AGRICULTURAL MACHINE.

1,175,544. Specification of Letters Patent. Patented Mar. 14, 1916.

Application filed December 13, 1915. Serial No. 66,608.

*To all whom it may concern:*

Be it known that I, ALEXANDER MOORE, a citizen of the United States, residing at Forest City, in the county of St. Francis and State of Arkansas, have invented new and useful Improvements in Agricultural Machines, of which the following is a specification.

This invention relates to agricultural machines, and it has for its object to produce an organized machine of simple and effective construction for preparing the seed bed, depositing the seed and covering the same at a single operation.

A further object of the invention is to produce a machine of the class described which will be equipped with grading members, supported adjustably so as to grade the surface of the soil in advance of the planter.

A further object of the invention is to produce a construction whereby the grading members will be mounted with the ends thereof independently adjustable in a suitable frame, a frame being provided for each grading member, and said frames being hingedly mounted in a main carrying frame so that the grading members may be raised from the ground when the machine is to be turned without changing or affecting the proper adjustment thereof.

A further object of the invention is to provide in connection with the grading members a smoothing device or sled for smoothing the bottom of the seed bed which is subsequently opened by a furrow opener.

A further object of the invention is to simplify and improve the construction and arrangement of the parts coöperating to form the improved structure.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a side view of the same. Fig. 3 is a longitudinal sectional view taken on the line 3—3 in Fig. 1. Fig. 4 is a transverse sectional view taken on the line 4—4 in Fig. 1. Fig. 5 is a rear elevation. Fig. 6 is a sectional detail view on a larger scale taken longitudinally through one of the tubular adjusting rods and related parts. Fig. 7 is a face view of one of the locking disks for said rods. Fig. 8 is a detail plan view of one of the combined drags and harrows.

Corresponding parts in the several figures are denoted by like characters of reference.

The main frame A of the improved machine is composed of side members 15 and front and rear cross bars 16, 17, whereby said side members are spaced and connected to produce a substantially rectangular frame. Said frame is also provided with a longitudinal center bar 18 which is connected with the side members by means of cross braces 19 with which auxiliary frames 20 are hingedly connected by means of interengaging staples and eyes 21, 22, or in any other convenient manner that will permit the said auxiliary frames to swing freely between the center bar 18 and the side members 15. Each of the frames 20 is provided with a spring actuated latch bolt 23 which when projected by its actuating spring 24 will engage the front cross bar 16 of the main frame, said front cross bar being provided with recesses 25 for engagement with said latch bolts.

Each frame 20 is provided with upstanding housings 26, 27, the first mentioned housings being located in advance of the housings 27 and relatively near the side members 15 of the main frame, while the housings 27 are located relatively near the center bar 18. The several housings contain vertically slidable rack bars 28 which extend downwardly through the respective frames 20 and serve to support the grader blades 29 with which the lower ends of said rack bars are pivotally connected, said grader blades occupying a rearwardly convergent position which is due to the above described location of the housings upon the respective frames, the forward ends of the grader blades being connected with rack bars which are located adjacent to the outer sides of the main frame and in advance of the bars with which the rearward ends of the grader blades are connected, said last mentioned bars being located adjacent to the center bar of the main frame. Each housing 26, 27 also affords bearings for a tubular operating rod 30 carrying a pinion 31 that engages the rack bar 28, thereby enabling said rack bars to be moved up and down for the purpose of effecting vertical adjustment independently of the front and rear ends of the grader blades. Each tubular operating rod carries at its rearward end a hand wheel 32 having a lug or bracket 33 on which is fulcrumed a lever 34 with which is connected one end of a rod 35 that extends within the tubular rod 30 and is connected with a slide 36 having an arm 37 that extends through a slot 38 in the tubular rod. The arm 37 carries a pin or bolt 39 that is guided through an aperture 40 in a collar or flange 41 on the rod 30, said bolt being adapted to engage any one of a plurality of recesses or apertures 42 in the face of an annular disk or ring 43 that is fixed on the housing with which the tubular rod is associated. The slide 36 is projected within the tubular rod by the action of a spring 44, whereby the locking pin or bolt 39 will be maintained in engagement with the recess 42 engaged thereby, thereby locking the tubular rod securely against rotation and serving to maintain the rack bar actuated by the pinion on said rod at the desired adjustment. By manipulating the lever 34, the slide carrying the locking bolt may be retracted, thereby permitting the tubular operating rod to be rotated about its axis for the purpose of effecting the desired adjustment. It will be seen that in this manner the front and rear ends of the grader blades are capable of being independently adjusted to any desired pitch, according to whether it may be desired to produce a level grade, a hill or a ditch.

The forward end of the main frame is supported by means of caster wheels 45, whereby the guiding and turning of the machine will be facilitated. The rearward end of the frame is supported by means of ground wheels 46, each mounted on an independent axle member 47, bearings for which are provided in brackets 48, 49 connected with and depending from the main frame at the rear end of the same.

The center bar 18 of the main frame supports near the rear end thereof a housing 50 which is substantially similar to the housings 26, 27, except that it contains two vertically movable rack bars 51, 52, one in front of the other, said rack bars being connected at their lower ends with a sled or drag 53, the purpose of which is to smooth the seed bed, to crush the clods and to pulverize the soil. The member 53 is of substantially triangular contour with the apex turned to the front and having a downwardly and rearwardly inclined bottom face 54 to engage the soil and to crush the clods. For the vertical adjustment of the rack bars 51, 52 a tubular operating rod 55 is provided which in every respect is similar to the tubular operating rods 30 hereinbefore described, except that it carries two pinions 56, 57 for engagement with the respective rack bars 51, 52.

Connected with and extending rearwardly from the rearward cross bar 17 of the main frame are the side members 58 of a seat supporting frame, said side members being connected at their rearward ends by a cross bar 59 on which the seat 60 is mounted. Each of the side bars 58 supports a foot lever 61 having a treadle or pedal 62 at one end, the other end of each foot lever being connected by a wire, cord or other suitable connection 63 with the spring actuated latch bolt 23 of one of the hinged frames 20, thereby enabling the latch bolts of said frames to be retracted. The rear cross bar 17 of the main frame is provided with lugs 64 on which levers 65 are pivoted, each of said levers being connected by a flexible connection 66 with the forward end of one of the frames 20, said flexible connections being guided over pulleys 67 supported on brackets 68 near the front end of the main frame and above the front ends of the hinged frames 20. It will be seen that by manipulating the levers 65 after retracting the latch bolts, the forward ends of the frames 20 may be lifted, thus lifting the grader blades carried by said frames clear of the ground without disturbing the relative positions of the front and rear ends of said grader blades. The levers 65 are provided with stop members 69 adapted to engage rack segments 70 for the purpose of sustaining said levers and related parts at various adjustments.

The rear cross bar 17 of the main frame is provided with rearwardly extending lugs or ears 71 with which links 72 are pivotally connected, the lower ends of said links being capable of swinging freely in a rearward direction while swinging movement in a forward direction will be obstructed by contact of said links with the rearward face of the cross bar 17. The lower ends of the links 72 are connected together by a rod 73 on which the planter frame P is pivotally mounted. Said frame comprises the side members 74 which are connected together and spaced apart by a cross bar 75 on which is mounted a housing 76, the construction of which is similar to that of the housings 26, 27 and 50, said housing containing a vertically adjustable rack bar 77 for the adjustment of which a tubular operating rod 78 is provided which is in every respect similar to the operating rods 30 hereinbefore described. The rack bar 77 extends downwardly through the cross bar 75 and is is connected at its lower end with a rocking bar 79 which is pivotally connected with arms 80 that extend rearwardly from a furrow opener 81, the forward end of which is connected by interengaging eyes or links 82, 83 with the rod 73 on which the forward end of the planter frame is supported. By vertical adjustment of the rack bar 77 the furrow opener is capable of being vertically adjusted so as to form a furrow of the desired depth for the reception of seed. The planter frame supports a seed hopper 84 and seed dropping mechanism which may be of any desired construction, according to the kind and character of seed that is to be planted, the moving parts of the seed dropping mechanism being actuated by a shaft 85 receiving motion from one of the axle members 47, said shaft and axle member being provided with interengaging gear wheels 86, 87.

The side members of the planter frame are provided with downwardly extending cover blades 88, and said side members are connected together at their rear ends by a rod 89 on which a frame 90 is pivoted, said frame carrying at its lower end a ground engaging wheel 91 and at its upper end an arm 92. One of the side members 58 of the seat supporting frame carries a hand lever 93 having a stop member 94 engaging a rack segment 95 whereby the lever and related parts may be sustained in adjusted position. The lever 93 is connected with the arm 92 at the upper end of the frame 90 by a flexible element, such as a cord 96, which is guided over a pulley 97 which is journaled in a frame 98 mounted on one side of the housing 50 or in some other convenient location. It will be observed that the weight of the planter frame is normally imposed on the pivoted frame 90 which is thereby maintained in a tilted position, the parts being so proportioned that when thus tilted the furrow opener will be in a ground engaging position. At such time the ground wheel 91 will also serve to pack the soil on the seed that has been covered by the coverers 88. By manipulating the lever 93 the frame 90 may be moved to an upright position, thereby serving to lift the planter frame to such an extent as to elevate the furrow opener clear of the ground, thereby facilitating the turning, as well as the transportation of the machine from place to place.

It is sometimes desired to use a harrow in connection with the improved machine for the purpose of assisting in breaking the clods and pulverizing the soil. For this purpose the drag member 53 may be provided with harrow teeth 99, as indicated in Figs. 6 and 8.

From the foregoing description, taken in connection with the drawings hereto annexed, the operation and advantages of this invention will be readily understood. It will be seen that I have produced an organized machine of simple and inexpensive construction for tilling the ground, preparing a seed bed and planting the seed at a single operation, thereby saving much time. The adjustable parts of the machine, such as the grader blades, the hinged frames carrying the same, the sled or drag which constitutes a crushing and smoothing device, and other parts are within the convenient control of the driver or operator, it being understood that the tubular operating rods whereby adjustments of some of the vertically movable parts are effected, as well as the levers which are used to effect adjustment of other parts, are all within the convenient reach of the driver or operator. Seed planting mechanism of any desired type or character may be employed, it being understood that seed of any kind may be planted by the improved device and that the power for actuating the moving parts of the mechanism is derived from one of the ground wheels of the main frame.

Having thus described the invention, what is claimed as new, is:—

1. In a machine of the class described, a wheel supported main frame, auxiliary frames hingedly connected therewith, spring actuated latch members carried by said auxiliary frames and engaging the main frame to sustain the auxiliary frames in position for operation, means for retracting the spring actuated latch members to release the auxiliary frames, and means for effecting adjustment of the auxiliary frames when thus released.

2. In a machine of the class described, a wheel supported main frame having a center bar, side bars, and cross bars connecting the center bar with the side bars, auxiliary frames hingedly connected with the cross bars, spring actuated latch members carried by the auxiliary frames and engaging the main frame, means for retracting the latch members, means for effecting adjustment of the auxiliary frames when the latch members are retracted, rearwardly convergent grader blades, one beneath each auxiliary frame, rack bars connected with the respective grader blades adjacent to the ends thereof and extending upwardly through housings on the respective auxiliary frames, and means for effecting independent adjustment of the rack bars and for securing the same in adjusted position.

3. In a machine of the class described, the combination with a wheel supported main frame, of two auxiliary frames hingedly connected therewith at the two sides thereof, rearwardly convergent grader blades so connected with and carried by said auxiliary frames as to permit the two ends of each blade to be independently vertically adjusted, latch members for securing the auxiliary frames in position for operation, means for retracting the latch member and means for effecting adjustment of the free ends of the auxiliary frames including hand levers, suitably guided flexible connections between the hand levers and the auxiliary frames, and means for securing the hand levers in position at various adjustments.

4. In a machine of the class described, a wheel supported main frame having seed bed preparing members adjustably connected therewith and carried thereby, a planter frame hingedly connected with and trailing in rear of the main frame, a tiltable frame connected with the rearward end of the planter frame and having a ground engaging wheel, said frame being gravitationally maintained in a tilted position by the weight of the planter frame, means for effecting adjustment of the tiltable frame to lift the rearward end of the planter frame, a link supported furrow opener beneath the planter frame, and means for effecting vertical adjustment of the rearward end of said furrow opener including a rack bar connected therewith, a housing on the planter frame through which said rack bar is guided, and means for effecting adjustment of said rack bar.

In testimony whereof I affix my signature in presence of two witnesses.

ALEXANDER MOORE.

Witnesses.
JOHN PRICE,
CHAS. L. SUMMONS.